United States Patent
Marchini

(10) Patent No.: US 8,240,115 B2
(45) Date of Patent: Aug. 14, 2012

(54) SUGAR CANE HARVESTER

(75) Inventor: Roberto Savio Marchini, Riberiao Preto (BR)

(73) Assignee: Valtra Do Brasil Ltda., Mogi Das Cruzes (BR)

( * ) Notice: Subject to any disclaimer, the term of this patent is extended or adjusted under 35 U.S.C. 154(b) by 0 days.

(21) Appl. No.: 12/864,564

(22) PCT Filed: Jan. 27, 2009

(86) PCT No.: PCT/IB2009/000132
§ 371 (c)(1),
(2), (4) Date: Jul. 26, 2010

(87) PCT Pub. No.: WO2009/095763
PCT Pub. Date: Aug. 6, 2009

(65) Prior Publication Data
US 2010/0307121 A1 Dec. 9, 2010

(30) Foreign Application Priority Data
Jan. 28, 2008 (BR) ...................................... 0800094

(51) Int. Cl.
*A01D 45/02* (2006.01)

(52) U.S. Cl. .......................................................... 56/63
(58) Field of Classification Search .................. 56/13.9, 56/16.4 B, 16.6, 63
See application file for complete search history.

(56) References Cited

U.S. PATENT DOCUMENTS

| 2,341,248 A * | 2/1944 | Urschel | 56/103 |
| 3,791,114 A * | 2/1974 | Fowler | 56/13.9 |
| 4,065,912 A * | 1/1978 | Quick | 56/13.9 |
| 4,270,337 A * | 6/1981 | Pinto | 56/13.9 |
| 4,555,896 A * | 12/1985 | Stiff et al. | 56/13.9 |
| 4,677,813 A * | 7/1987 | Stiff et al. | 56/13.9 |
| 4,924,662 A * | 5/1990 | Quick | 56/12.8 |
| 5,031,392 A * | 7/1991 | Baker | 56/13.9 |

* cited by examiner

*Primary Examiner* — Alicia Torres

(57) ABSTRACT

A sugar cane harvester (1) with cab (23), a chassis (5), a tip cutting device (2), a cane line dividing device (3), a base cutting device (14), a set of rollers (6) for conveying the sugar cane, a sugar cane chopping device (15), a cane cleaning device (8), an engine, an elevator (9) located in its central portion and comprising a 180 degree turning mechanism and an engine (12) located in its rear portion, independent of the chassis. Each of the rollers (6) is powered by at least one hydraulic motor housed inside the roller, with an aperture being provided in the chassis through which the motor can be removed.

11 Claims, 15 Drawing Sheets

SUGAR CANE HARVESTER

FIELD OF THE INVENTION

This invention relates to a sugar cane harvester of a substantially reduced size with the capability of harvesting up to two rows of sugar cane. The harvester chops and cleans the cane during its harvest in the field and then ejects the cane stems into a lorry or receiving infield wagon.

DESCRIPTION OF THE PRIOR ART

At present, most sugar cane harvesters are very large and have very powerful engines and very complex electronics. Harvester users are often people who do not have the prerequisites for carrying out harvesting adjustments and repairs to the harvesters when necessary.

Another drawback of the prior art harvesters is that most of them have the engine in the central area of the chassis, which causes great disturbance when maintenance needs to be carried out on it. As it is generally adjacent to the cab, it is necessary for the mechanics to be, in some situations, almost head-down in order for them to reach certain parts of it.

Also, another drawback is the fact that the elevators are arranged at the rear of the harvester and some of these models do not rotate 180° for unloading. The rear location of the elevator, in addition to impairing the stability of the harvester, restricts its field of turning for the cut cane to be deposited in the infield wagon or in the lorry which accompanies the harvester. It is often not possible to use a lorry for accompanying and for collecting the canes which are ejected by the harvester, as, due to unevenness in the ground, there is no way of placing it on the only side determined by the harvester.

Brazilian application PI 7607340, published on Oct. 4, 1977, describes a sugar cane harvester comprising several items of equipment: a cane tip cutting device, line dividers, base cutting, conveying rollers, chopping cutter, primary extractor, elevator and secondary extractor. The above-mentioned harvester is moved by means of tires or metal tracks.

A disadvantage of this machine is in the feed system between the base cutting and the conveying rollers, which are of different diameters and difficult to access for maintenance. Due to the different diameters of the rollers, the peripheral speed between them is different, which causes damage to the body and bud of the cane and, therefore, impairs its quality. Another problem is located in the primary extractor, which has orientation impaired due to the lack of a straw-removing duct (hood) and the straw is then left scattered on the soil, impairing harvesting of the rows of cane. The elevator in this patent is not articulated and, this being the case, transfers all of its impact with the infield wagon or lorry body to the machine's chassis. Another problem lies in the arrangement of its base cutting, which is such that this harvester does not succeed in harvesting the cane close to the soil, so as to cause the "uprooting" of the stump or the opposite, leaving the stump with an unwanted size or high cut. The above-mentioned harvester uses metal tracks, which are expensive to maintain and make access for mechanical maintenance difficult. Another problem is the fact that the engine in this machine is located in its central portion and that the elevator is located in the rear portion and its tipping, not articulated. This causes the harvester to be unstable, even on account of its having been designed for use in topography of land which is flat and without any incline. It is also to be noted that the positioning of the engine in the centre of the machine makes it difficult to access for maintenance.

Another document from the prior art is PI 9804182-7, published on Mar. 28, 2000, which relates to a sugar cane harvester comprising a cane tip cutting device, line dividers, base cutting, conveying rollers, chopping cutter, rotor for ejecting the stems and blowing for cleaning them. It does not have an elevator which has 180 degree turning and which is tipping or articulated. This impairs the stability and transporting of the machine on account of the elevator height. The cut cane conveying rollers are of different diameters, something which impairs the synchronization of these at the same speed. Another fact is the large size of the machine's track (distance between the centres of the tires on the same axle), which complicates transporting the machine to the place where it is required for use (transported by lorries). A further problem is that the arrangement of its base cutting is such that this harvester does not succeed in harvesting the cane close to the soil. This being the case, it causes the "uprooting" of the stump or leaves the stump with an unwanted size or cut which is high for re-sprouting. It does not have a feed roller, which is the first one to touch the cane to assist its being carried to the inside of the machine but only has a deflecting plate. The elevator is articulated only laterally, which could be detrimental in the event that there is an impact between the elevator and the body of the lorry receiving the cane.

North American document U.S. Pat. No. 6,363,700 B1, published on Apr. 2, 2002, relates to a sugar cane harvester comprising cane tip cutting devices, line dividers, base cutting, conveying rollers, chopping cutter, a fixed, substantially central elevator and a pressing (blowing) straw extractor, with rear-mounted engine and rear steering. In this harvester, base cutting is ahead of the front tire. One problem is that the arrangement of its base cutting is such that this harvester does not succeed in harvesting the cane close to the soil, so as to cause the uprooting of the stump, leaving the stump with an unwanted size or high cut. Another disadvantage of this machine is in the feed system between the base cutting and the conveying rollers which are of different diameters and difficult to access for maintenance.

The distance between the rollers causes loss of sugar cane and the weight of the movable upper rollers causes crushing of the cane. The elevator is fixed and central and only ejects (loads) the pieces of cane laterally. The harvester's steering is through the machine's rear wheels, something which causes the responses for turning in the centre of the line to be slow, mainly in places with an incline. Again, there is a problem with the size of the track, which detracts from transporting the machine on trailers. Its rear axle makes maintenance of and access to the conveying rollers difficult.

OBJECT OF THE INVENTION

It is an object of the present invention to provide a sugar cane harvester which mitigates the above drawbacks.

SUMMARY OF THE INVENTION

Thus according to the present invention there is provided a sugar cane harvester with cab, comprising a chassis, a tip cutting device, a cane line dividing device, a base cutting device, a set of rollers for conveying sugar cane, sugar cane chopping device, cane cleaning device, engine, ground contacting means for moving the harvester and an elevator, the above-mentioned harvester being characterized in that the elevator is located in a central portion of the harvester and has a 180-degree turning mechanism and in that the engine is located in the rear portion of the harvester, independent of the chassis.

Other features and aspects of the invention are defined in the accompanying claims.

For example, the sugar cane harvester of this invention has a base cutting device with the angle of attack between the machine and the start of cutting in the range of 55 to 75 degrees (typically 65 degrees) with respect to the soil and base cutting discs, the ends of which are perfectly aligned with the point where the front tire first touches the soil. It is to be noted that the harvester closely follows the soil contours as a result of the intersection of the steering front tires' footprint and the base cutters. The above-mentioned harvester also has a central elevator with 180° turning, which makes it easier to unload the cut cane on any side. The elevator also has an articulation at the start of its uppermost portion.

With regard to tires and wheels, it is to be noted that the preferred embodiment of this invention is constructed with four wheels with tires but that a second embodiment comprises the exchange of the rear tires for two half-tracks on the harvester. The use of the half-track on the rear portion of the machine gives more traction to the machine as a whole and, with this, it can move more easily in places with great inclines and places where stabilization is difficult, thus improving the harvester's versatility.

The set of sugar cane conveying rollers of this invention comprises at least one feed roller, capable of leaning the cane to be cut with respect to the soil and at least one lifting roller for raising the cane for being conveyed to the inside of the machine, by the conveying rollers. The conveying rollers comprise fixed lower rollers and movable upper rollers which carry the cane and clean it, removing mineral and vegetable impurities. The moveable upper rollers are detachably interconnected by a single pivot pin. An internal ring which extend over the end portion of each roller protects bearings and at least one hydraulic motor inside each fixed roller against the ingress of soil.

The sugar cane chopping device has a gearbox which is shielded, thus preventing contamination of the oil and possible maintenance work due to impurities in the gearing.

The above described cane harvest reduces the cost per tonne harvested and also reduces the down time for maintenance of the harvester. The purchase cost of the harvester is also reduced and consequently the manufacturing cost of the sugar cane harvester. The components of its hydraulic system are also reduced as is the weight and consequently there is a reduced compacting of the soil, increasing the productivity of the cane. Access for maintenance of the engine and other components is also easier and the stability of a harvester in the field, on land with steep inclines is improved.

Improvement of the germination of the cane also occurs by not uprooting or shaking the stump due to the use of a favourable cutting angle in the base cutting device.

SUMMARIZED DESCRIPTION OF THE DRAWINGS

DETAILED DESCRIPTION OF THE DRAWINGS

Figure 1:
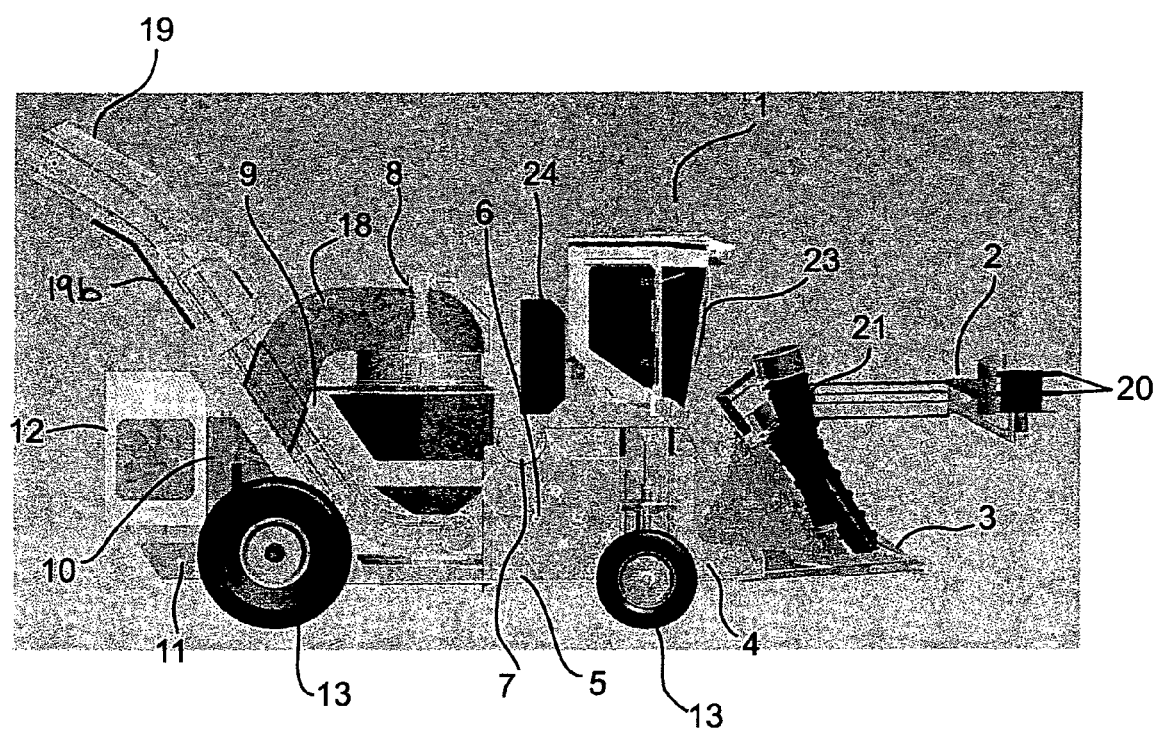
FIG. 1 shows a left-hand side view of the harvester of this invention.

Referring to the drawings, FIG. 1 gives a general view of the harvester 1 which comprises a tip cutting device 2 containing two gathering discs 20. The above-mentioned device is generally made with metal tubes and sheets welded, steel shot blasted, painted, fitted and fastened with nuts and bolts, bearings and grease. It has the function of gathering the cane tips at the centre of the tip cutting via two gathering discs 20, one rotating clockwise and the other rotating anti-clockwise, with suitable fingers. It guides the cane to the central cutting disc, which rotates clockwise and anti-clockwise and is provided with cutting blades (small cutters). In addition to the fingers, the gathering discs have a serrated disc for assisting in guiding the cane tips to the centre of the device. The movements (height adjustment) of the cutting device 2 can be carried out by means of hydraulic cylinders.

Figure 2:
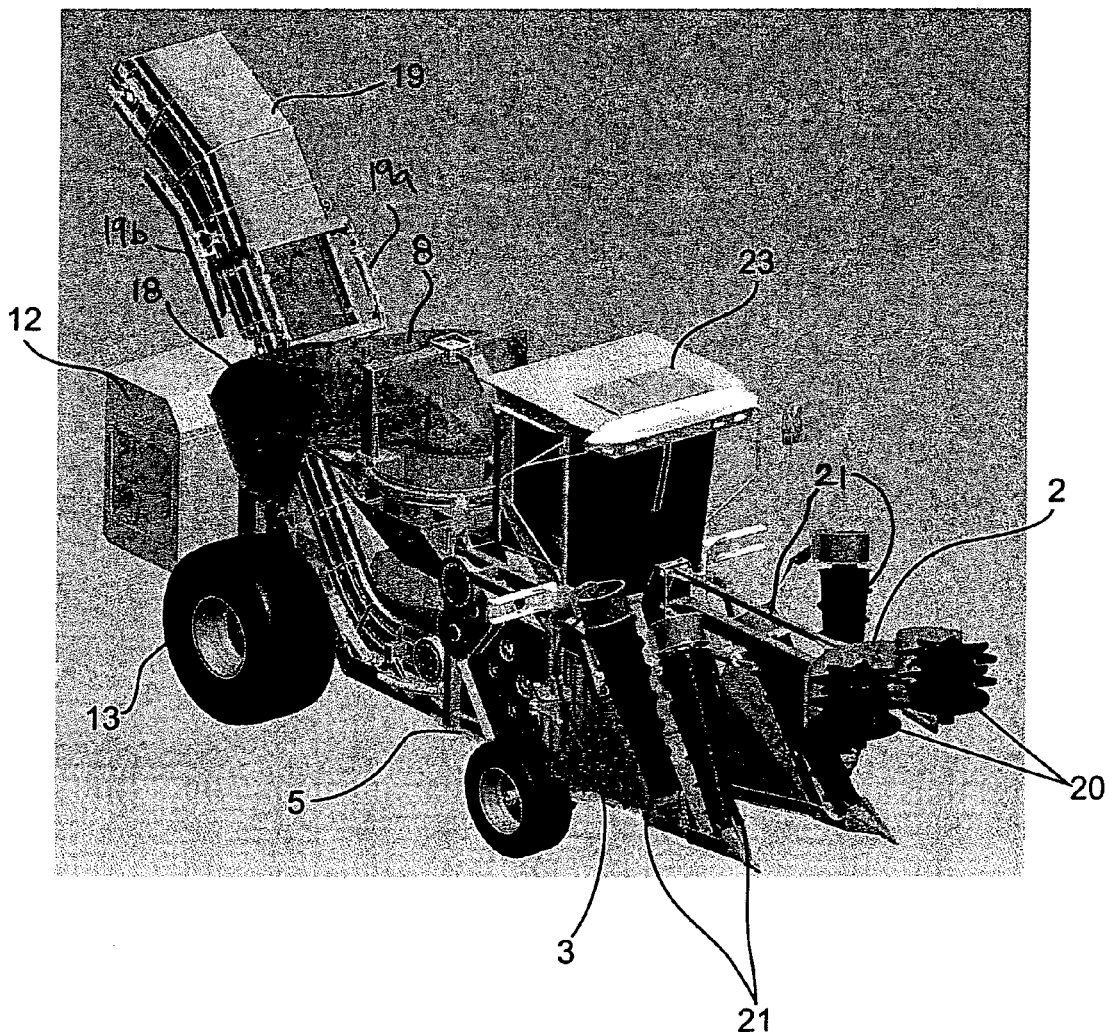
FIG. 2 shows a perspective view taken from the left front side of the harvester of this invention.

In FIG. 2, the line dividers 3 can be seen and these are made with metal tubes and sheets welded, steel shot blasted, painted, fitted and fastened with nuts and bolts, bearings and grease. They separate the lines of cane brought down by gales and some cane having fallen in the act of the harvest itself, which cane remains on the soil and is guided to the centre of the machine. All this is done by means of the left-hand and right-hand dividers, each of them, 3, being fitted with two "lollipops" 21 (separating rollers with spirals for lifting the cane). Their movements are also carried out by means of independent hydraulic cylinders. The drive is generally by means of four hydraulic motors of the system. One hydraulic cylinder for each divider 21 causes the height of the nose to be adjusted with respect to the soil, which is carried out as controlled by the operator.

Figure 7:
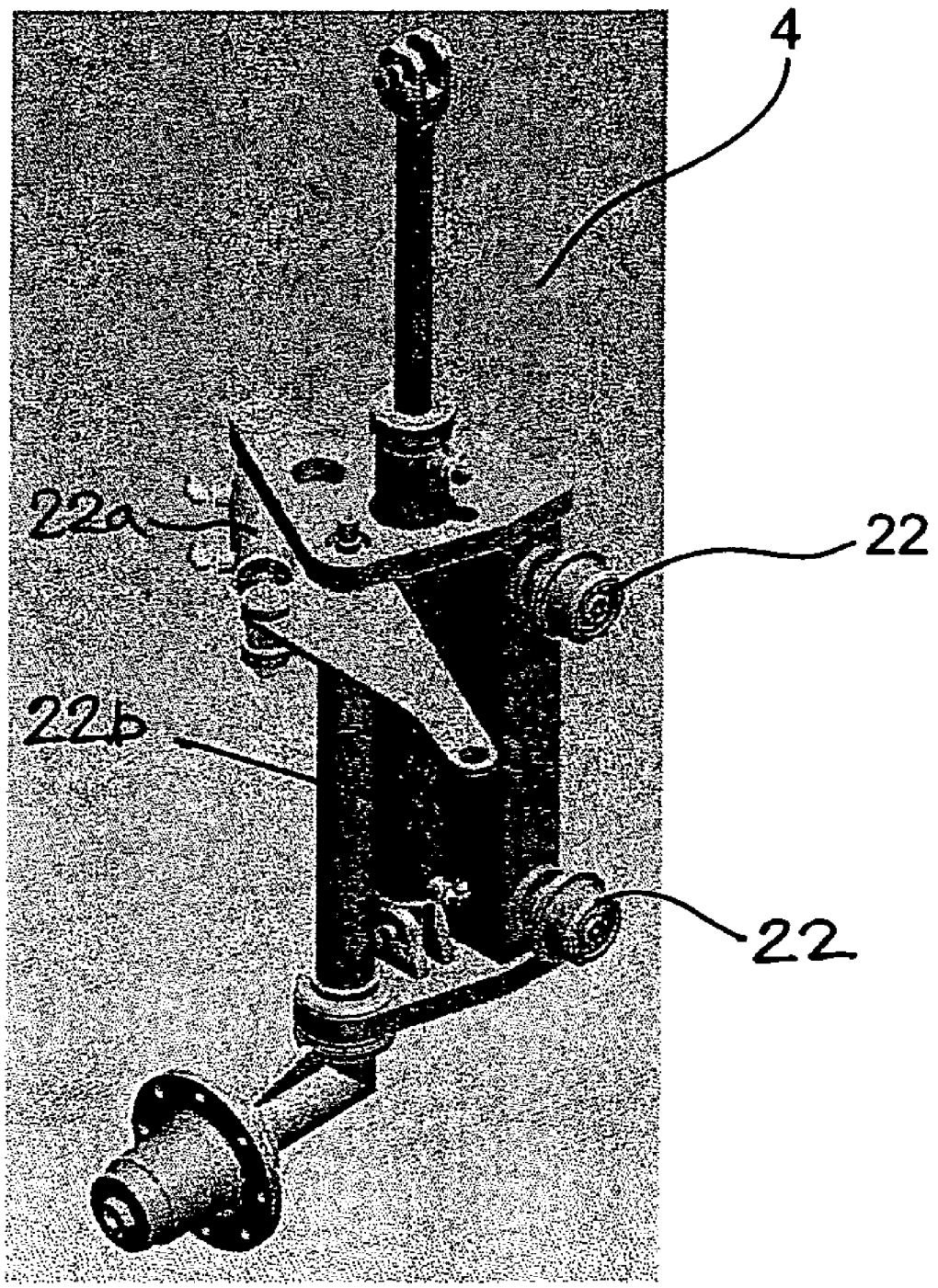
FIG. 7 shows a perspective view of the fitting of the right-hand suspension of the harvester of this invention.

FIG. 1 and also FIG. 7 show the suspension assemblies 4, which are made with metal tubes and plates welded, steel shot blasted, painted and fitted with bearings, lock rings, rollers 22, wheels and front tires 13 and hydraulic cylinders. In addition to being responsible for the way in which the chassis 5 of the harvester deals with ground of any type, the suspension assembly 4 serves the purpose of lowering and raising the base cutting disc 14, as well as copying the soil surface with (left and right) independent movements, given the fitting of the hydraulic cylinders in parallel. Logically, this assembly also gives the harvester basic steerability. The machine's steering is actuated by means of a steering movement hydraulic cylinder 22a and with two raising cylinders 22b. A hydraulic valve is responsible for its adjustment and is electrically controlled by the operator.

Figure 3:
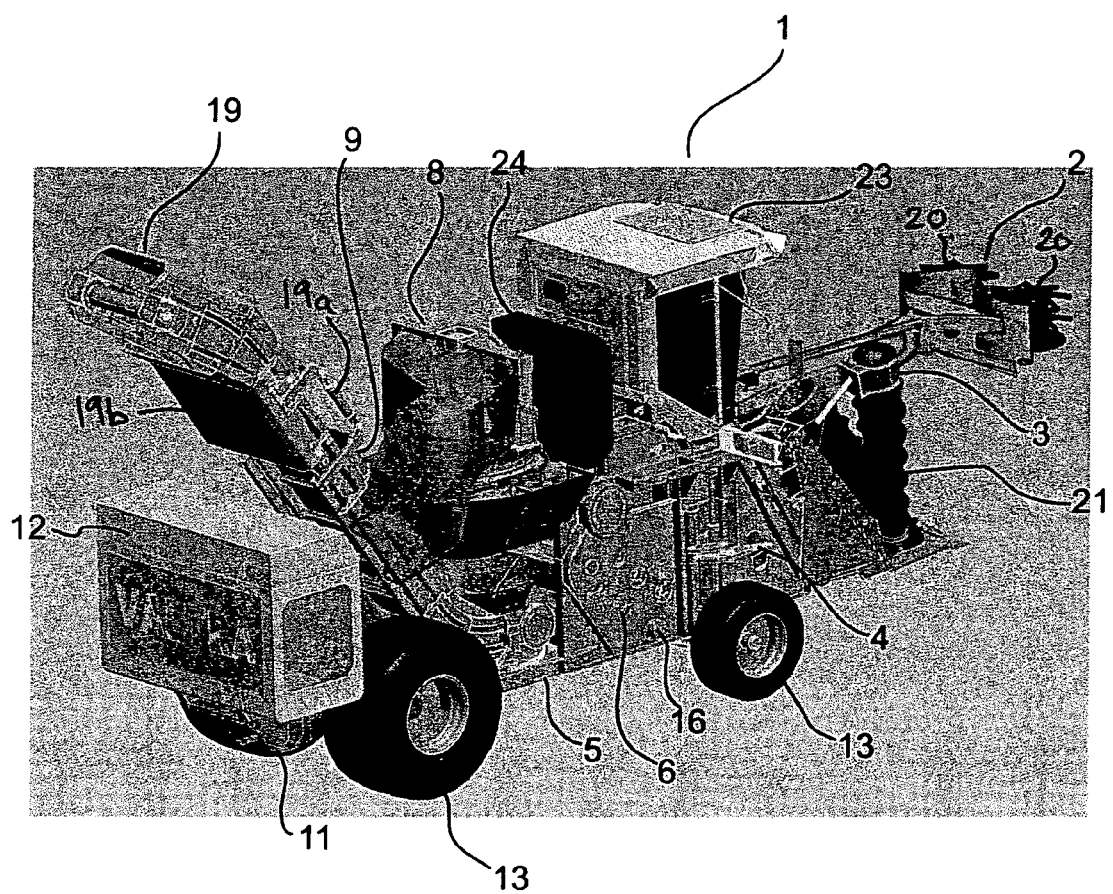
FIG. 3 shows a perspective view taken from the left rear side of the harvester of this invention.

It is noted that, with a sliding system using rollers 22, smooth movements are made possible on any type of ground, without any radial stress in the structure of the chassis 5. In FIGS. 3 and 7, it can be seen that the suspension 4 is easy to fit and maintain. The chassis 5 is made with welded metal tubes and plates and supports several devices, for example the tip cutting device 2, line dividers 3, base cutting 14, conveying rollers 6, chopping cutter 7, primary extractor 8, elevator 9, hydraulic tank 10, engine enclosure 12, fuel tank 11, cab, hydraulic components, electrical components, hydraulic oil and fuel, transmission, suspension, wheels and tires. It is an independent chassis which is not monobloc.

Figure 4:
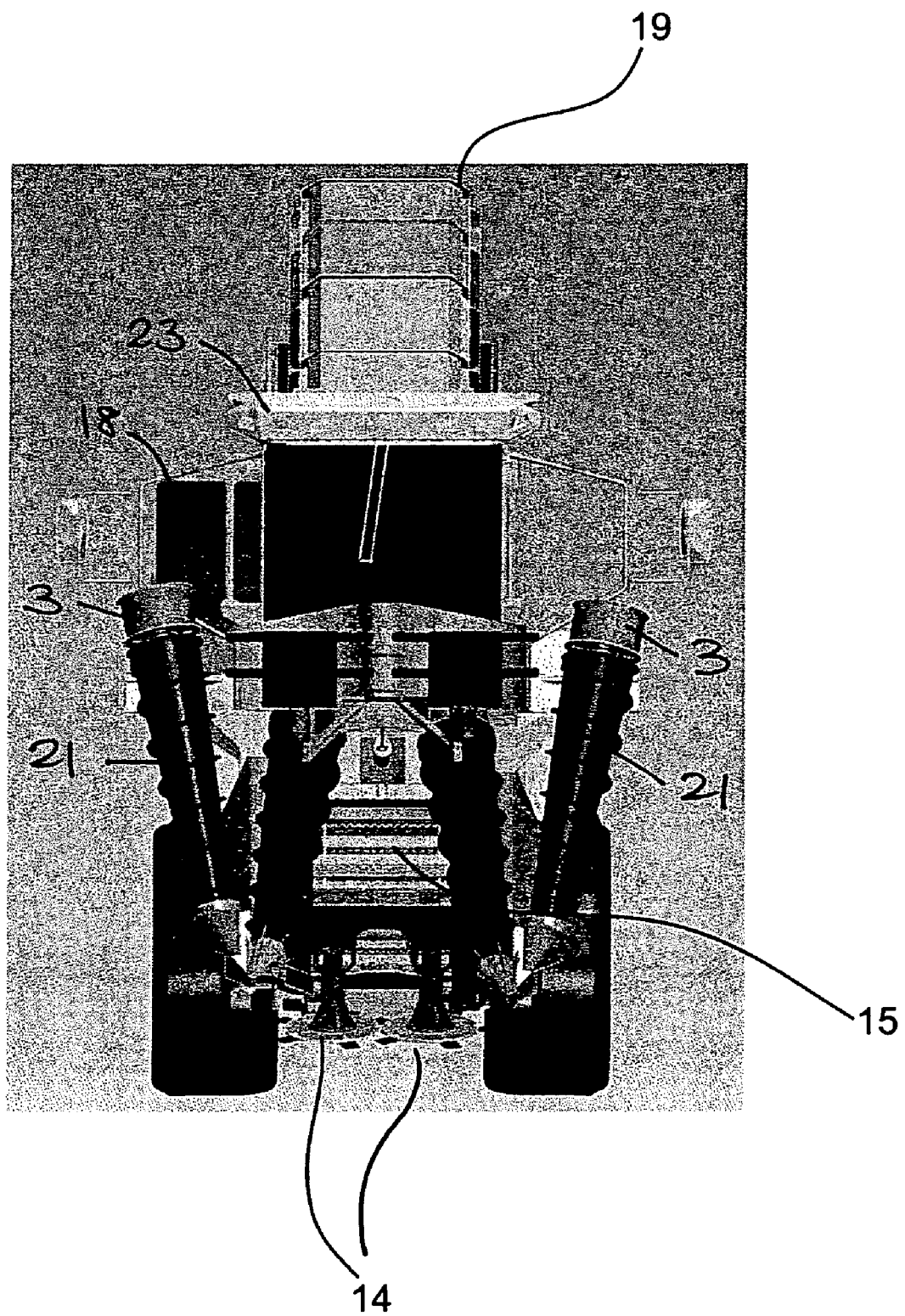
FIG. 4 shows a front view of the harvester of this invention.
Figure 8:
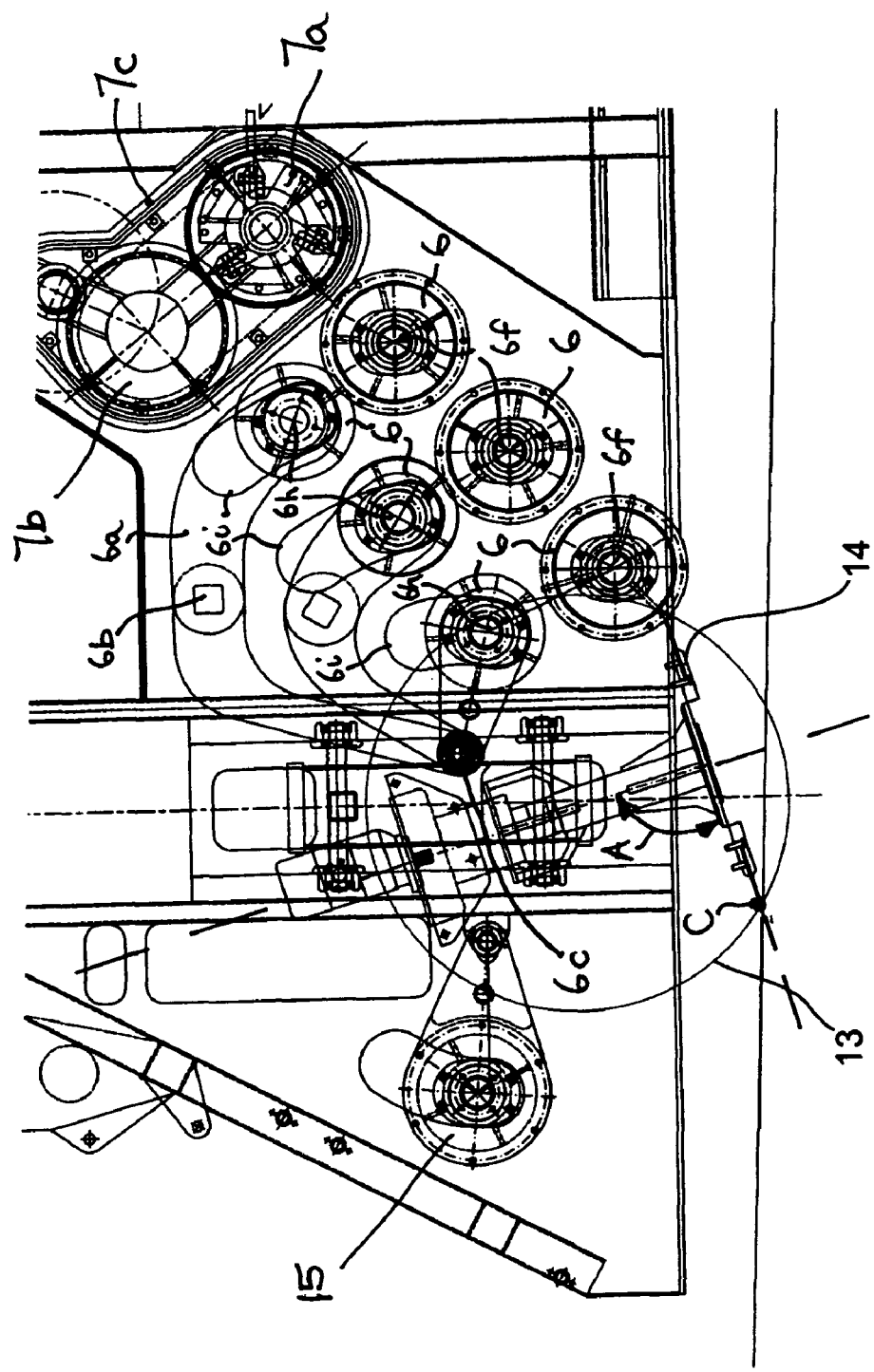
FIG. 8 shows a part section side view of the cutting device and conveying rollers of the harvester of this invention.

The conveying rollers 6 (preferentially six units) are fitted with pins and fastened by nuts, bolts and bearings. They convey all the cane to the chopping cutter 7. The feed roller 15, shown in FIGS. 4 and 8, is driven by two internal hydraulic motors one at each end which are accessible from outside the chassis. This feed roller makes the first contact with the cane to incline the cane so that it is ready to be cut. After the cane has been cut, lower fixed rollers 6 and upper moveable rollers 6 carry the cane to be chopped and ejected to the straw extractor 8 and then to the elevator 9. The upper rollers are carried by arms 6*a* which are pivoted at 6*b* and are connected to a single pivot pin 6*c* of an approximate diameter of 50 mm, for simultaneous movement away from the lower rollers when crop is fed between the rollers. This provides an arrangement such that there is less need for maintenance. The first lower roller 6 which lifts the cane after cutting is powered by two internal hydraulic motors one at each end and the remaining two lower rollers 6 and the three upper rollers 6 are each driven by one internal hydraulic motor so that rollers 6 and feed roller 15 have a total of nine internal hydraulic motors which can all be accessed from outside the chassis and removed from within their respective roller via an aligned aperture in the chassis. Their bearings have special shielding so as to avoid constant greasing. All the diameters of the rollers which are responsible for the actual conveying are the same, which provides a same peripheral speed and, in addition to this, they are all driven by identical hydraulic motors. The adjustment of the upper movable rollers takes place by itself as a result of the arms 6*a*, in accordance with the volume (layer) of cane and its respective varieties.

Figure 16:
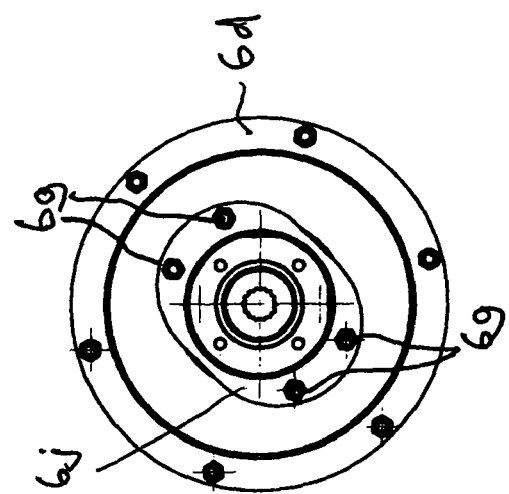
FIGS. 15 and 16 show sectional and end views respectively of a feed roller used in the harvester of this invention.
Figure 15:
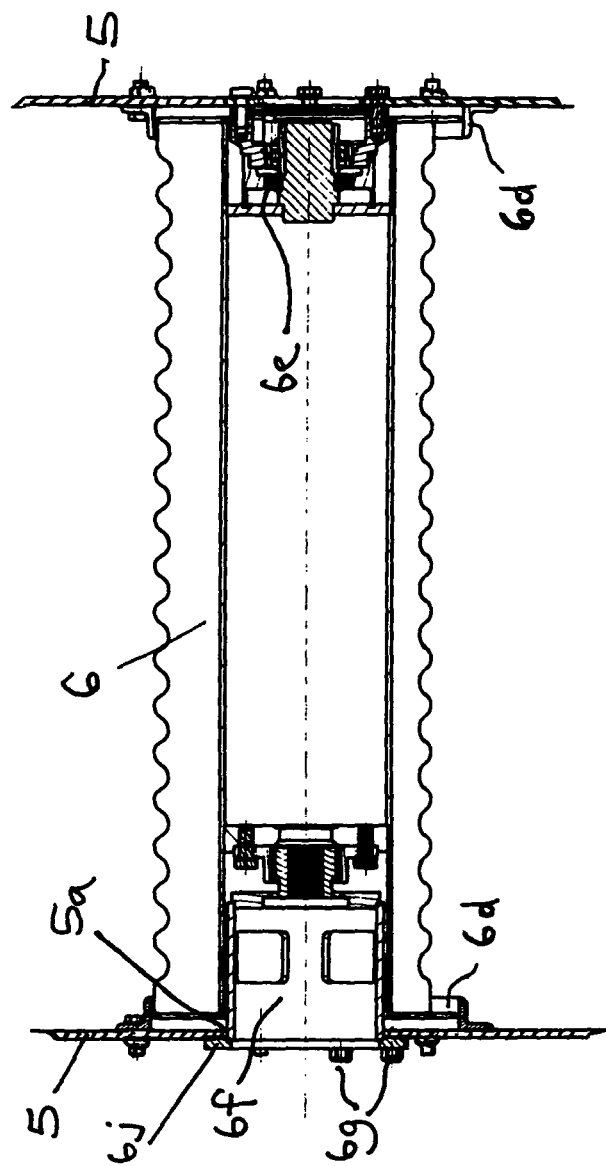

Each roller 6 or 15 also has an internal ring 6*d* (see FIGS. 15 and 16 which show details of one of the single motor powered lower fixed rollers) which surrounds a short portion of the end of the roller to protect the internal bearing 6*e* and motor 6*f* of the roller from the ingress of soil from the harvested cane. The hydraulic motors of 6*f* is accessible via an aperture 5*a* provided in the sides of the chassis 5 and can be removed by undoing bolts 6*g* which hold the motor to the chassis via mounting flanges 6*j*.

The motors 6*h* of the moveable upper rollers can also be removed via curved solts 6*i* in the sides of the chassis 5.

A chopping cutter 7 is displayed better in FIG. 4 and is made with metal tubes and plates welded, steel shot blasted, with special internal treatment, painted and fitted with gears, bearings, seals, grease and lubricating oil. The above-mentioned cutter 7 comprises lower and upper chopping rollers 7*a*, 7*b*. There is a possibility of making the case of the cutter 7 in cast steel. The function of the chopping cutter 7 is to chop the cane into stems and to eject them into the primary extractor 8 and to the elevator 9. The chopping cutter 7 comprises a gearbox and an inertia wheel with clutch for compensating for the torque of the hydraulic motors. The opposed movements of the chopping rollers with sharpened cutters, which cross one another at the time of cutting, carry out the separation of the stems. The cutter is driven, generally, by means of two hydraulic motors of the system. The adjustment of the cutters is generally carried out only on the upper roller. The case is made in a shielded manner, without the need to open it to carry out the cutter adjustments. It is also noted that, with this facility, it is possible for just one mechanic to work on its maintenance.

The primary extractor 8, which can be seen in FIGS. 1 to 5, basically follows the same form of construction as the other equipment, i.e. it is made with metal tubes and sheets welded, steel shot blasted, painted, fitted with bearings and fastened with nuts and bolts. The hood 18 can also be made with rotationally moulded polyurethane. The extractor 8 is used for extracting straw when the stems are chopped and ejected on to the elevator 9. It generally has four blades rotating clockwise with spiner in the centre for sucking air from the outside to the inside, carrying straw with it, the straw being directed, through the hood 18, on to the soil, beside the harvester. The extractor 8 is driven by a hydraulic motor of the system. The air flow is controlled by the operator, by means of a flow regulating electrical hydraulic valve. Due to the hood, the straw can be directed on to the soil without dirtying the tractor and infield wagon.

In FIGS. 2 and 3, the elevator 9 can be seen better. It too is made with welded metal tubes and sheets, fitted and fastened with nuts and bolts, chains and pockets (structural parts and components of the elevator). It is used for conveying and raising the clean stems from the harvester to the infield wagon or lorry, by means of pockets spaced apart and fastened to the chains. As the elevator has 180-degree rotation about axis X-X and is driven by rack and pinion, harvesting is possible in both directions of transfer (i.e the stems can be discharged to either side of the harvester). Two hydraulic motors are used for driving the elevator's chains with pockets. One motor is used for rotating the elevator and two cylinders are used for its articulation. Adjustment is carried out by means of hydraulic valves. The second and upper part 19 of the elevator 9 can be pivoted relative to the lower part by means of hydraulic cylinders 19*a*. This second part 19 is provided with a protection shield 19*b* which is mounted by springs on the elevator to protect the elevator from impacts with the infield wagon during harvesting. The fact that this part is movable is important in order that the elevator, when having some impact with the lorry body, does not cause damage to the harvester chassis and, in addition to this, allows better positioning of the elevator as a whole. Also due to this, it is possible for the machine to be used in uneven topographies, so as to plan an adjustment of the height of the elevator's unloading the stems into the lorry.

The elevator 9 is located in the middle of the harvester, not at the rear like the one in other harvesters and rotation is carried out by rack, pinion and hydraulic motor instead of by hydraulic cylinders like the others. The articulation is used for adjusting the elevator for transporting the machine and for unloading cane into the infield wagon on the contours.

The engine compartment 12, shown in FIGS. 1, 2, 3 and 5, is made with metal tubes and sheets welded, steel shot blasted, painted and fitted, with a diesel engine and its ancillaries—for example, pumps and gear case and oil cooler—and fastened with nuts and bolts on the rear portion of the chassis. The engine compartment 12 is independent of the chassis (i.e. not within the chassis) and, due to this, can be replaced easily. The engine is used for driving the case of pumps of the hydraulic system and transmission. It is not located in the chassis monobloc. It is also noted that it is fitted in the rear portion of the harvester, not in the central portion, as in the other harvesters.

The hydraulic tank 10 is used for storing and filtering the system's hydraulic oil and it is operated by means of hydraulic pumps. It is an individual, independent tank and is not in the chassis monobloc, thus avoiding leaks. The fuel tank 11 is made with metal tubes and sheets welded, steel shot blasted, with special internal treatment, painted, fitted and fastened with nuts and bolts. It can also be made of rotationally moulded polyurethane. It too is an individual, independent tank and is not in the chassis monobloc, thus avoiding leaks.

The harvester cab 23 can be seen in FIGS. 1 to 4. It is made with metal tubes and sheets welded, painted and fitted, with glass panes, seats, controls, air conditioning, steps, locks and mirrors and fastened with nuts and bolts and pads on to the chassis. Its purpose is to protect the operator from the outside environment. The harvester's water radiator 24 is situated behind the cab. The location of this radiator prevents debris emanating from the field for harvesting and from the cane itself from reaching and damaging the said radiator.

Figure 5:
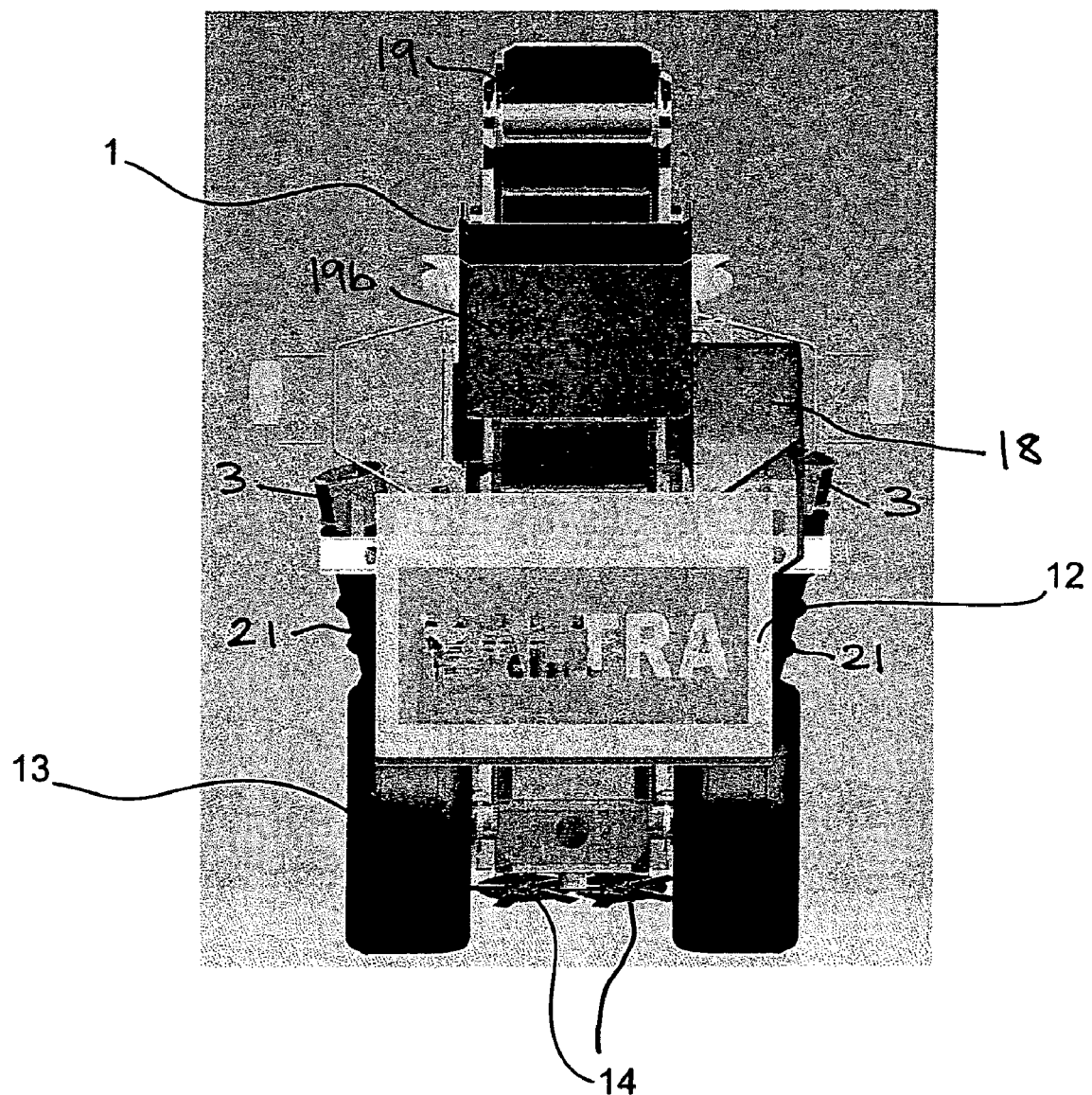
FIG. 5 shows a rear view of the harvester of this invention.
Figure 6:
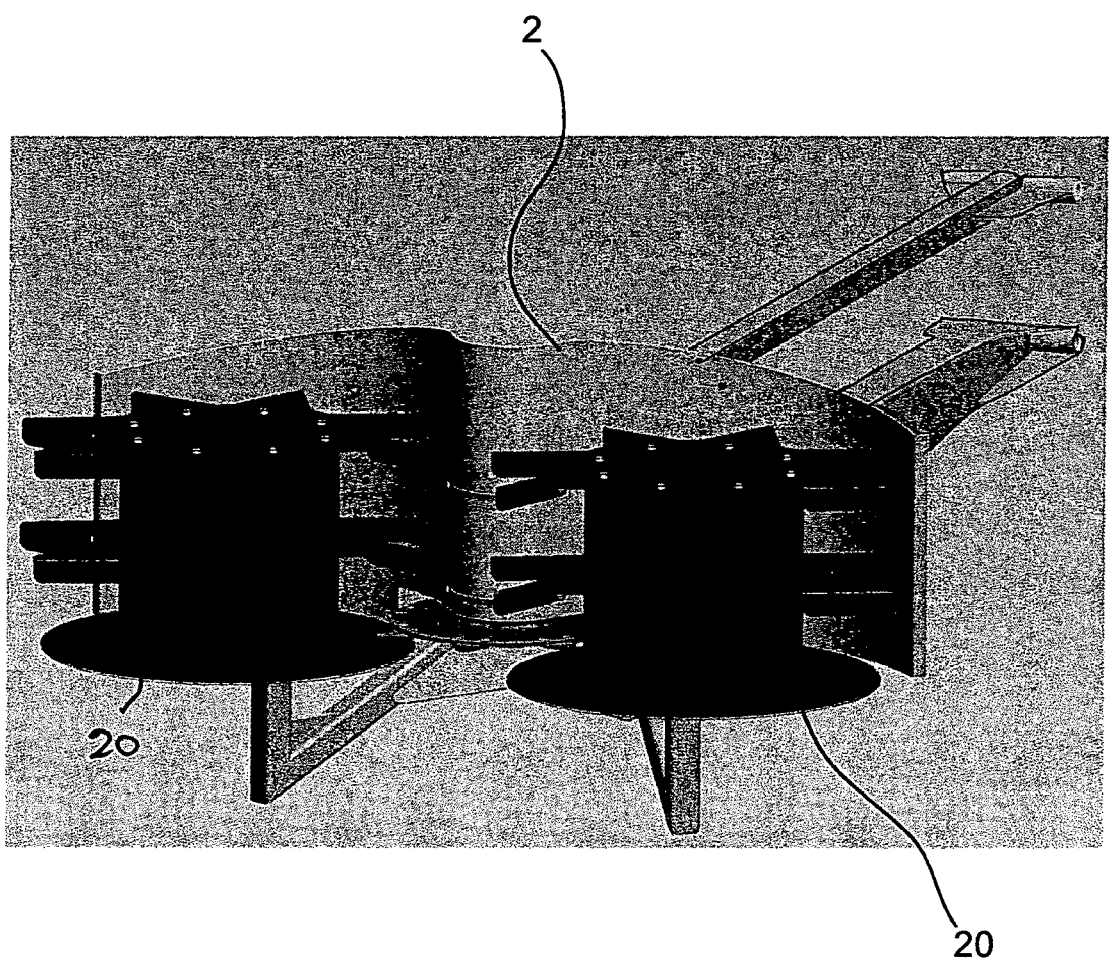
FIG. 6 shows a perspective view of the cane tip cutting device of the harvester of this invention.

The cane base cutting device 14 is seen better in FIGS. 4, 5 and 8. This device has the purpose of promoting the basal cutting of the cane, by means of two base cutting discs, which rotate in opposite directions with preferentially five sharpened blades each, which are intercalated with one another. The depth control is carried out by means of hydraulic cylinders in the suspension and by the operator.

The base cutting device 14 is driven by means of one hydraulic motor of the system and its adjustment is carried out by means of hydraulic cylinders connected in parallel in the suspension.

It is noted that the position in which the base cutting is located is strategic from at least two viewpoints:

First: the angle of attack between the harvester and the start of the cutting is in the range 55 to 75 degrees [typically 65 degrees (see angle A)] with respect to the soil, thus preventing the breakage of the foot of the cane before the said cane is cut, i.e. totally suitable for the conditions of Brazilian soil.

Second: the height of the base cutting discs is controlled by suspension hydraulic cylinders connected in parallel and front tires. The end part of the base cutting discs is perfectly aligned with the point C where the tire first touches the soil. When we see the harvester in a side view by means of FIG. 8, it is observed that the point at which the cutter cuts the cane is aligned with the point where there is the first contact of the tire with the soil.

It is noted that this harvester can also use an electronic system with sensors in base cutting for control of copying the terrain of the soil.

Figure 9:
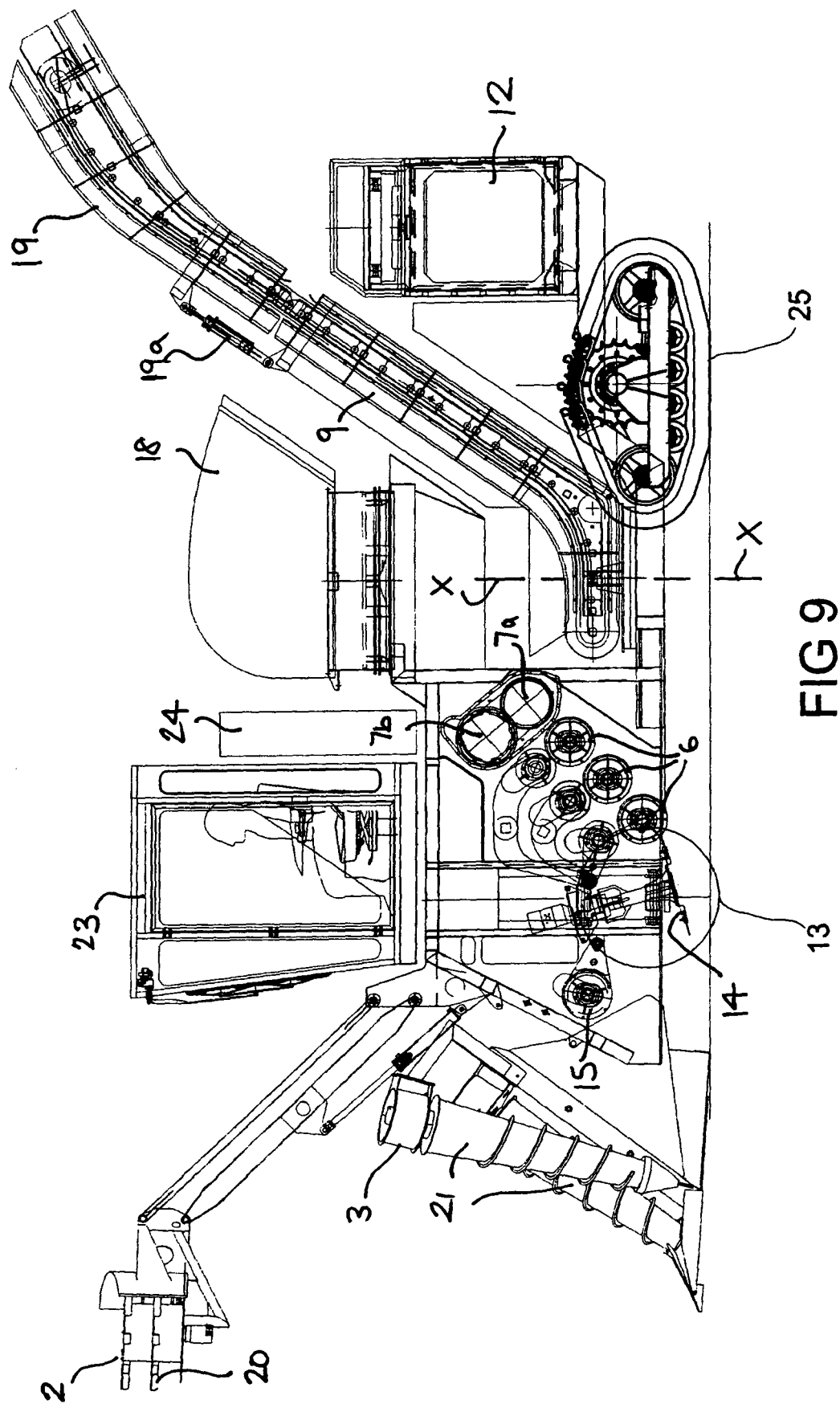
FIG. 9 shows the fitting of the half-track assembly in place of the harvester's rear wheels and tires.
Figure 10:
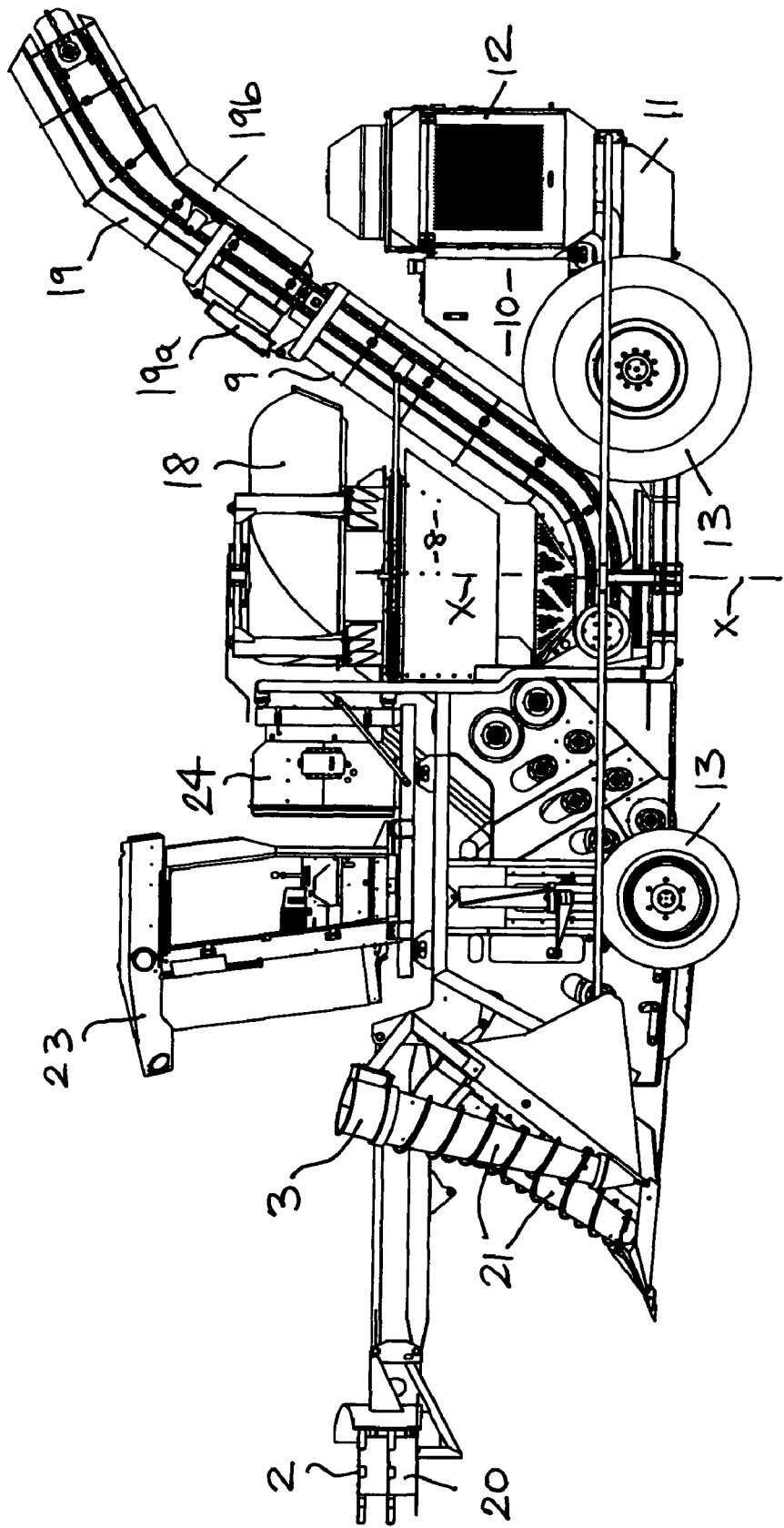
FIGS. 10, 11, 12, 13 and 14 show line drawings of additional side, front, perspective, plan and exploded views of the harvester of this invention.
Figure 11:
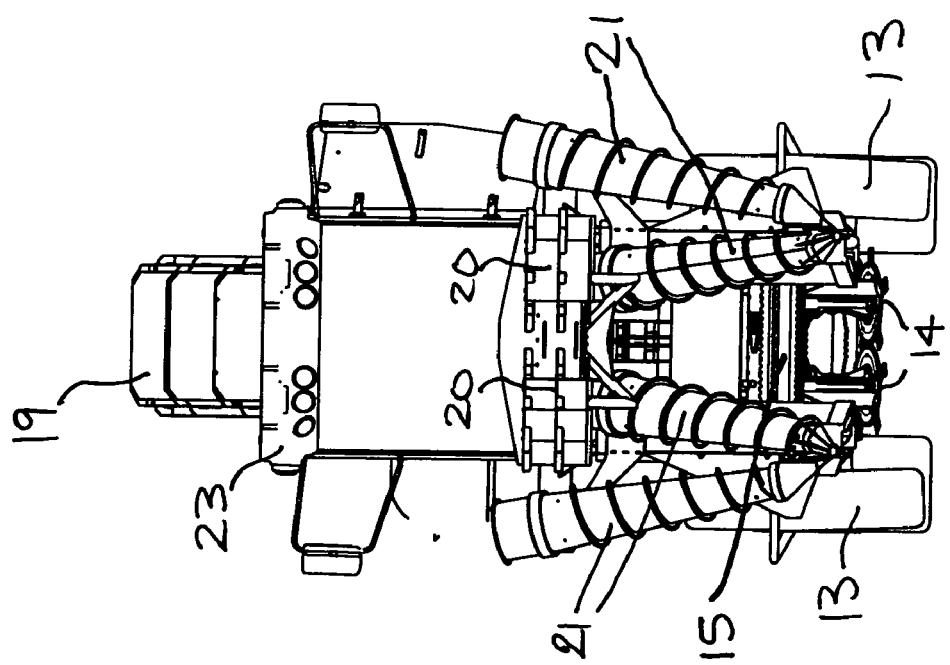
Figure 12:
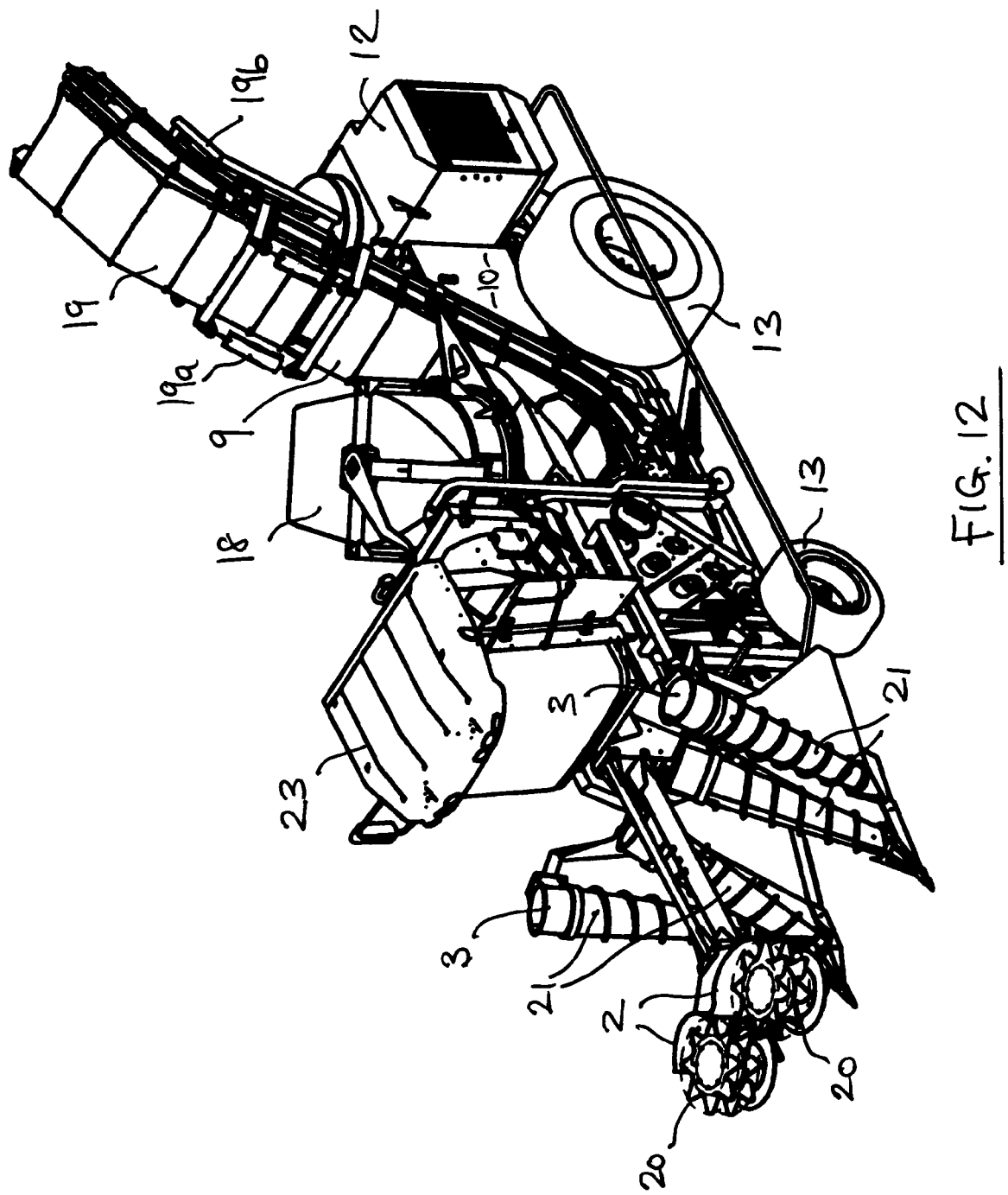
Figure 13:
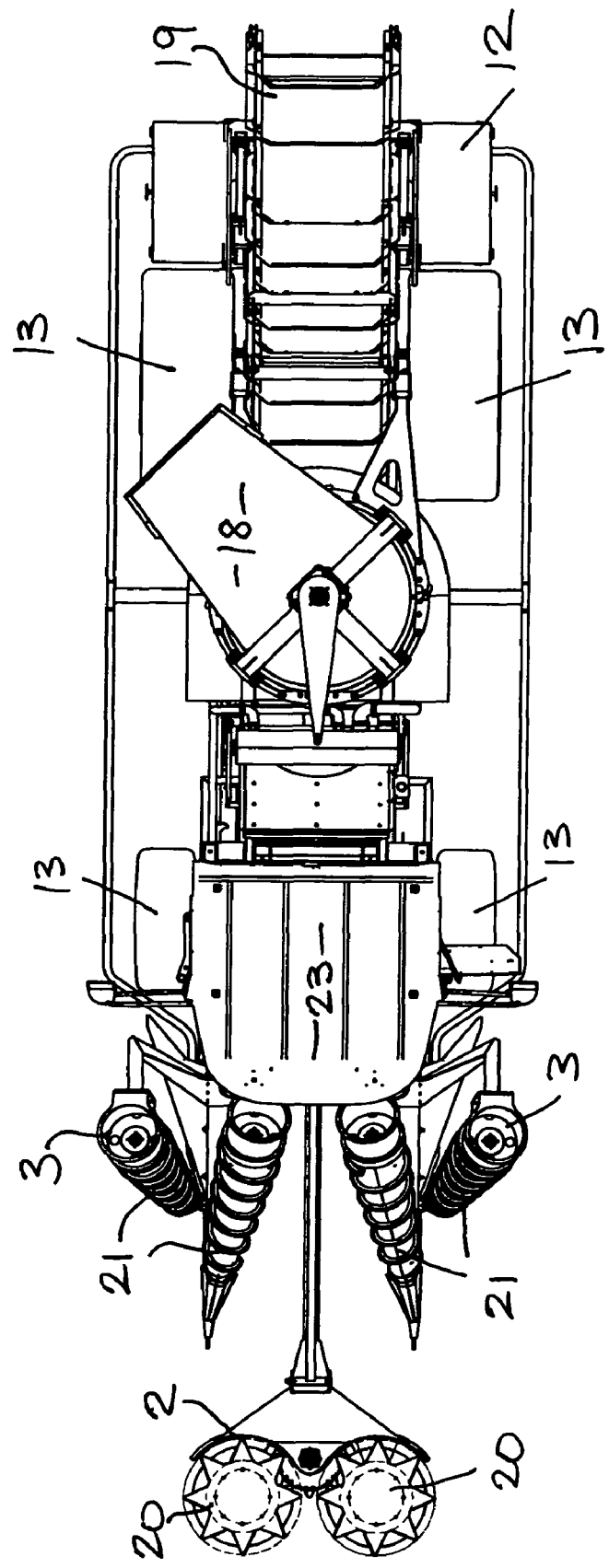
Figure 14:
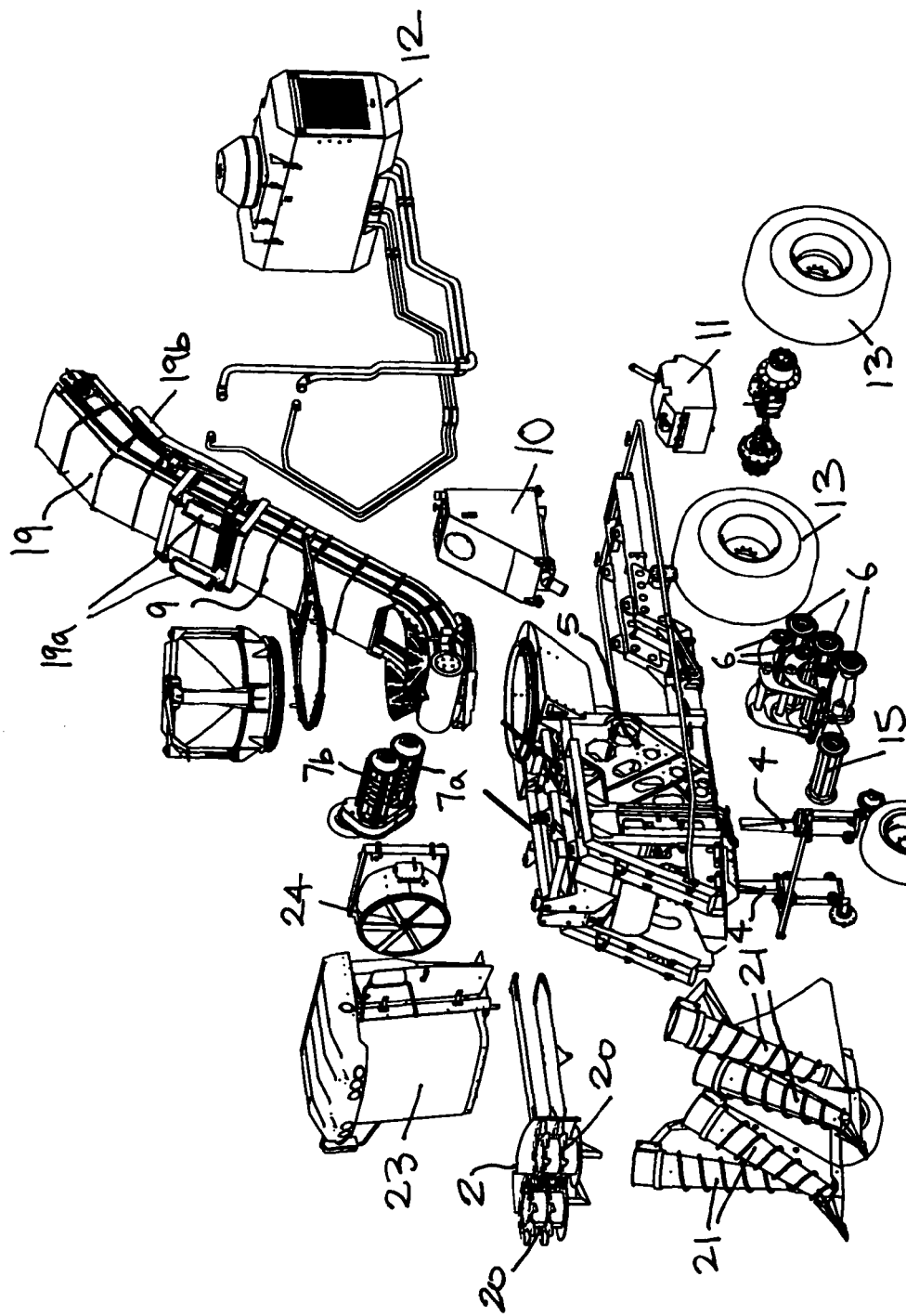

FIG. 9 shows a second embodiment of the harvester of this invention, which comprises the exchange of the rear tires 13 for two half-tracks 25 on the harvester. The use of the half-track on the rear portion of the machine gives more traction to the machine as a whole and, with this, it can move more easily in places with great inclines and places where stabilization is difficult, thus improving the harvester's versatility.

Therefore, it must be understood that this invention and its component parts described above form part of a preferred embodiment and of examples of situations which could occur. The real purpose of the subject of the invention is defined in the claims.

The invention claimed is:

1. A sugar cane harvester with cab (23), the harvester comprising;
    a chassis (5);
    a tip cutting device (2);
    a cane line dividing device (3);
    a base cutting device (14) having base cutting discs the ends of which are aligned with the point where a front ground contact means (13) first touches the soil;
    a set of sugar cane conveying rollers (6) for conveying sugar cane;
    a sugar cane chopping device (7);
    a cane cleaning device (8);
    an engine (12) located in a rear portion of the harvester, independent of the chassis (5);
    ground contacting means (13,25) for moving the harvester; and
    an elevator (9) located in a central portion of the harvester having a 180-degree turning mechanism and wherein the set of sugar cane conveying rollers (6) comprises fixed lower rollers and moveable upper rollers (6) which convey the cane and wherein each cane conveying roller (6) is powered by at least one hydraulic motor housed inside the roller, an aperture (5*a*) being provided in the chassis through which motor can be removed.

2. A sugar cane harvester according to claim 1, wherein the base cutting device (14) has an angle of attack (A) between the machine and the start of cutting in the range of 55 to 75 degrees with respect to the soil.

3. A sugar cane harvester according to claim 1, wherein at least one feed roller (15) is provided which is capable of inclining the cane to be cut with respect to the soil.

4. A sugar cane harvester according to claim 1, wherein the moveable upper rollers of the set of sugar cane conveying rollers (6) are detachably interconnected for simultaneous movement away from the fixed rollers by a single pivot pin (6*c*).

5. A sugar cane harvester with cab, comprising:
    a chassis:
    a tip cutting device;
    a cane line dividing device;
    a base cutting device;
    a set of rollers for conveying sugar cane;
    a sugar cane chopping device;
    a cane cleaning device;
    an engine;
    ground contacting means for moving the harvester; and
    an elevator located in a central portion of the harvester having a 180-degree turning mechanism and wherein the engine is located in a rear portion of the harvester, independent of the chassis and the base cutting device has base cutting discs the ends of which are aligned with the point where a front ground contact means first touches the soil, wherein each cane conveying roller has an internal ring surrounding each end of the roller, the ring extending axially over an end portion of the roller to protect bearings and/or motor which are housed inside the roller from soil.

6. A sugar cane harvester according to claim 1, wherein the sugar cane chopping device (7) has a shielded case (7*a*).

7. A sugar cane harvester according to claim 1, wherein an uppermost portion (19) of the elevator (9) can be moved relative to the lower portion of the elevator to position the uppermost portion for unloading.

8. A sugar cane harvester according to claim 1, wherein a lower side of the elevator carries a protective shield which is spring mounted on the remainder of the elevator to allow movement of the protective shield relative to the remainder of the elevator to provide protection for the elevator from impacts with adjacent vehicles during unloading.

9. A sugar cane harvester according to claim 1, wherein the ground contacting means comprise four tires (13).

10. A sugar cane harvester according to claim 1, wherein the ground contacting means comprise two front tires (13) and two rear half-tracks (25).

11. A sugar cane harvester with a cab (23), comprising:
    a chassis (5);
    a tip cutting device (2);
    a cane line dividing device (3);
    a base cutting device (14);
    a set of rollers (6) for conveying sugar cane;
    a sugar cane chopping device (7);
    a cane cleaning device (8);
    an engine (12); and
    an elevator wherein the set of cane conveying rollers (6) comprises pairs of lower and upper rollers, each roller being powered by at least one hydraulic motor housed inside the roller, an aperture being provided in the chassis through which the motor can be removed.

* * * * *